INVENTOR
CLARENCE J KELLER
BY
HIS ATTORNEYS

Aug. 15, 1939.  C. J. KELLER  2,169,802
APPARATUS FOR FORMING AND ATTACHING PLUG TERMINALS
Filed Feb. 23, 1938   7 Sheets-Sheet 3

INVENTOR
CLARENCE J KELLER
BY
HIS ATTORNEYS

Aug. 15, 1939.  C. J. KELLER  2,169,802
APPARATUS FOR FORMING AND ATTACHING PLUG TERMINALS
Filed Feb. 23, 1938  7 Sheets-Sheet 6

INVENTOR
CLARENCE J KELLER
BY
Spencer, Hardman & Fehr
HIS ATTORNEYS

Aug. 15, 1939.        C. J. KELLER         2,169,802
APPARATUS FOR FORMING AND ATTACHING PLUG TERMINALS
Filed Feb. 23, 1938        7 Sheets-Sheet 7

INVENTOR
CLARENCE J KELLER
BY
*Spencer, Hardman & Fehr*
HIS ATTORNEYS

Patented Aug. 15, 1939

2,169,802

UNITED STATES PATENT OFFICE 2,169,802

APPARATUS FOR FORMING AND ATTACHING PLUG TERMINALS

Clarence J. Keller, Anderson, Ind., assignor to General Motors Corporation, Detroit, Mich., a corporation of Delaware Application February 23, 1938, Serial No. 191,901

6 Claims. (Cl. 153—1)

This invention relates to the manufacture of ferrule terminal members for electrical conductors.

An object of the present invention is to provide a machine for punching a blank from sheet material, forming the blank to receive an end of a conductor cable, and for attaching the ferrule to the cable.

Further objects and advantages of the present invention will be apparent from the following description, reference being had to the accompanying drawings wherein a preferred embodiment of the present invention is clearly shown.

In the drawings:

Figs. 1 and 1a taken together form a side elevational view of a machine embodying the present invention.

Fig. 2 is a progressive plan view in perspective, of a blank punched from sheet metal by the machine shown in Figs. 1 and 1a.

Figs. 3 and 4 are perspective views of a terminal ferrule formed from the blank and attached to the cable.

Figure 1:
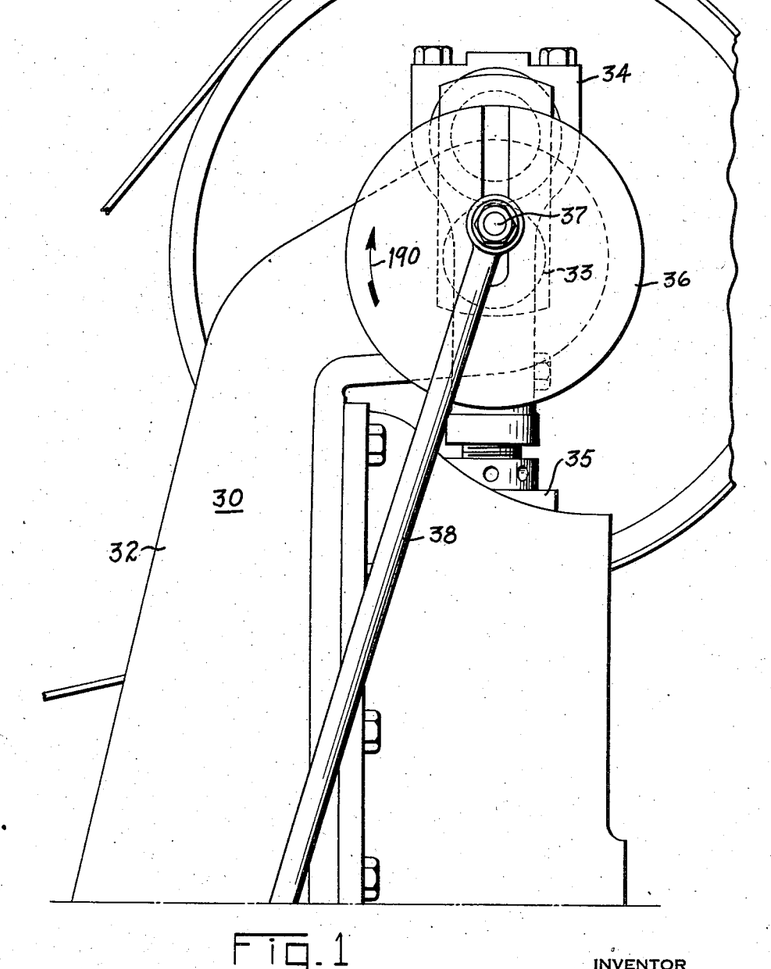
Figures 1A, 2, 3, 4:
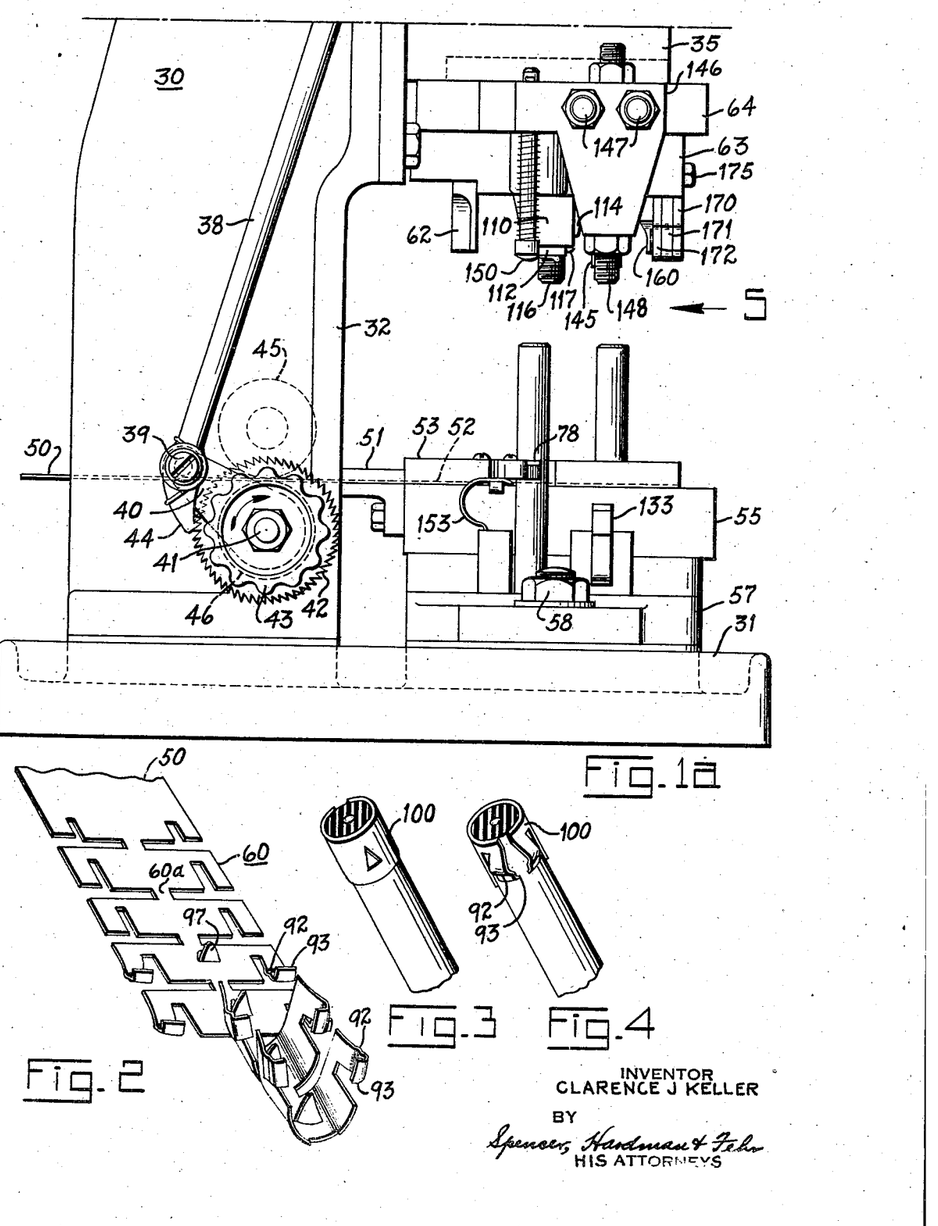
Figure 5:
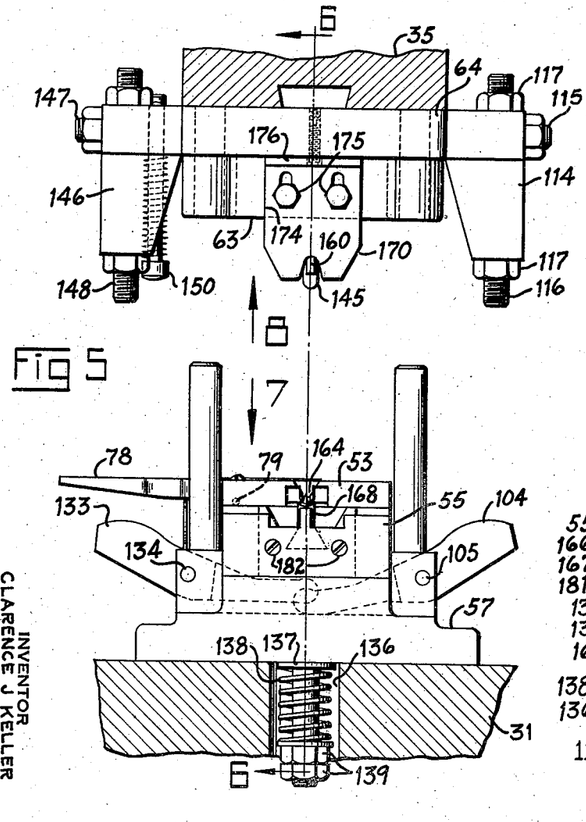
Fig. 5 is a fragmentary side elevational view, partly in section, of the parts of the apparatus attached to the head and base of the punch press as viewed in the direction of the arrow 5 of Fig. 1.

Referring to the drawings, a punch press 30 comprises a bed 31 integral with side frames 32, one of which is shown in Figs. 1 and 1a. The upper ends of the side frames provide bearings for a shaft 33 having a crank or eccentric well known to those skilled in the art, and connected by an eccentric link 34 with a vertical reciprocal head 35. The shaft 33 carries a crank disc 36 carrying an adjustable crank pin 37 connected by a rod 38 with a pivot screw 39 carried by the free end of an arm 40 loosely journalled on a feed roll shaft 41 to which is attached a ratchet wheel 42 and a hand wheel 43. A ratchet pawl 44 is supported by the lever 40 and engages the ratchet wheel 42 in order to turn the latter only in a clockwise direction as viewed in Fig. 1a whenever the arm 40 is moved in the same direction. The shaft 41 is therefore intermittently rotated in order to operate feed rolls 45 and 46 which intermittently feed a strip of sheet metal 50 (see also Figs. 6 and 9) thru a guide 51, a shallow groove 52 in a cover plate 53 which is attached by screws 54 to a base frame 55. The base frame is also secured by screws 54 to a base block 57 attached by studs 58 to the bed 31 of the machine.

Figures 9, 10, 11:
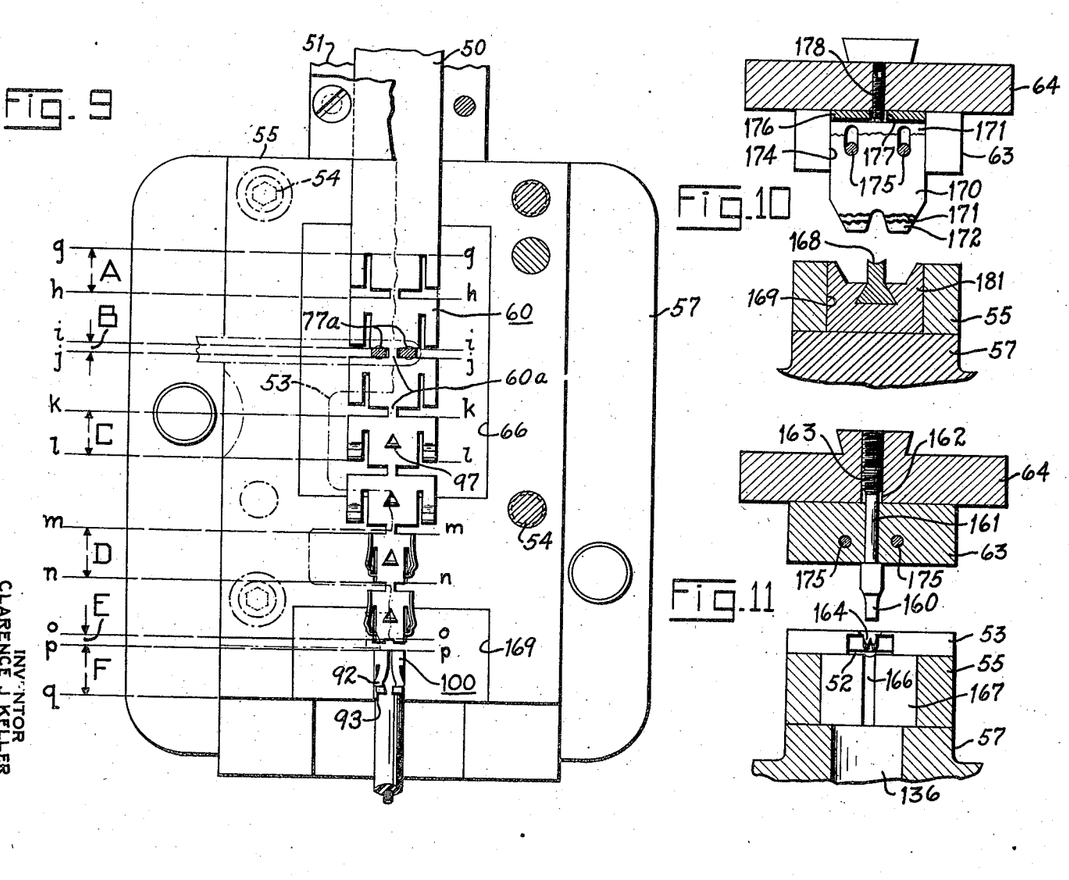
Fig. 9 is a plan view of the flat metal strip showing the various operations performed by the punches as the strip is intermittently fed thru the die.
Fig. 10 is a sectional view taken on the line 10—10 of Fig. 6 with parts broken away for clearness.
Fig. 11 is a sectional view taken on the line 11—11 of Fig. 6.
Figure 19:
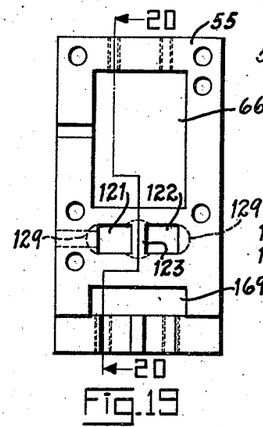
Fig. 19 is a plan view of a base frame.
Figure 20:
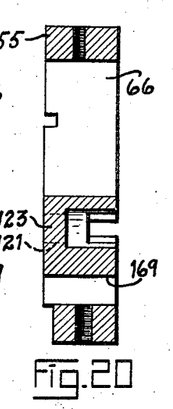
Fig. 20 is a sectional view taken on the line 20—20 of Fig. 19.
Figure 21:
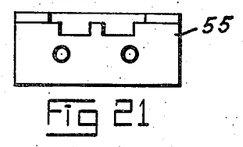
Fig. 21 is an end view of the base frame shown in Fig. 19.
Figure 22:
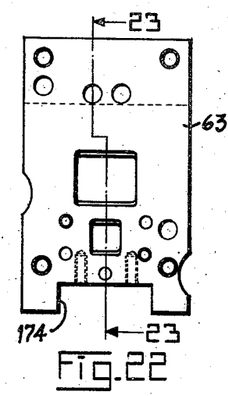
Fig. 22 is a plan view of a supporting plate.
Figure 23:
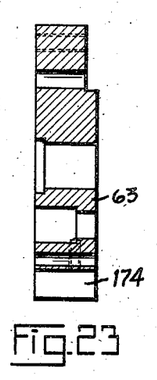
Fig. 23 is a sectional view taken on the line 23—23 of Fig. 22.

The metal strip 50 is shaped to form a blank 60 shown in Figs. 2 and 9 by punches 61 and 62 attached to a block 63 which is attached to a block 64 secured to the press head 35. The punches 61 and 62 cooperate with a die block 65 (see Figs. 6 and 9). The die block 65 is located within an aperture 66 (see Fig. 19) provided by the base frame 55. The die block 65 is provided with T-shaped openings and is so positioned in the aperture 66 that the T-shaped openings align with openings 67 and 68 provided in the cover plate 53 for receiving the punches 61 and 62 respectively. The pieces punched out, providing the T-shaped recesses on the edges of the strip, are forced through the die block 65 into apertures 71 and 72 of the base block 57 and bed 31 respectively. In this way the punches 61 and 62 cooperate with the die member 65 to punch out a series of blanks 60 having a pair of arms on the edges thereof and connected together by a neck portion 60a.

The feeding mechanism is adjusted so as to feed the strip 50 toward the right as viewed in Fig. 1a or downwardly as viewed in Fig. 9 a distance equal to the length of the blank 60 including the neck portion 60a. Referring to Fig. 9 and using station A between parallel lines g—g and h—h to designate the position of the work in which the blank is first punched, station C between the lines k—k and l—l will be the position of the work in which the blank is pierced and the arms deformed to form resilient arms for the ferrule designated in its entirety by numeral 100, station D between the lines m—m and n—n will be the position of the work in which the blank is folded into a U-shaped formation, station E between the lines o—o and p—p will be the position of the work when the ferrule is severed from the blank as the ferrule is being attached to the end of the cable which is accomplished between the lines p—p and q—q at station F.

Figure 14:
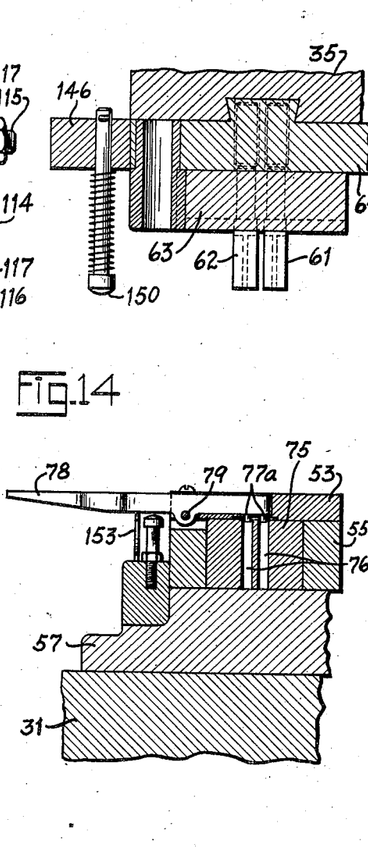
Fig. 14 is a sectional view taken on the line 14—14 of Figs. 6, 7, and 8.
Figure 15:
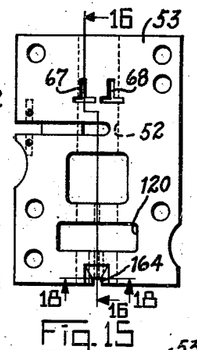
Fig. 15 is a plan view of a cover plate.
Figure 16:
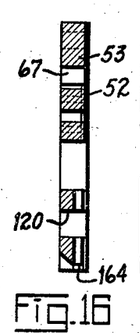
Fig. 16 is a sectional view taken on the line 16—16 of Fig. 15.
Figure 17:
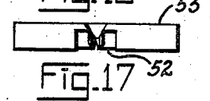
Fig. 17 is an end view of the cover plate shown in Fig. 15.
Figure 18:
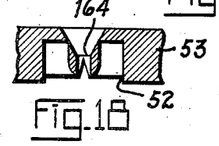
Fig. 18 is a sectional view taken on the line 18—18 of Fig. 15.
Figure 24:
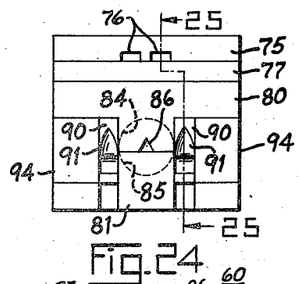
Fig. 24 is a plan view of the die members used in the present invention.

The operation of piercing a blank and deforming the arms in the manner specified is performed at station C by a piercing and forming assembly located within the aperture 66 of a base frame 55 adjacent the die block 65. The assembly also includes an automatic locking assembly, referred to as station B in Fig. 9 of the drawings. This locking assembly comprises a plurality of members positioned adjacent the left-hand side of the die block 65 and includes a block 75 (see Fig. 24) provided with a pair of notches or recesses 76. A plain block 77 abuts the block 75 to close the open end of the notches 76. These notches are adapted to receive pins 77a carried by a locking lever 78 suitably pivoted at 79 on the cover plate 53 secured to the base frame 55 as shown in Fig. 14.

The piercing and forming apparatus for piercing the blank and for deforming the arms thereon comprises a pair of T-shaped blocks 80 and 81 having their stems provided with ledged portions 82 and 83 and cylindrical portions 84 and 85 respectively. The stem portions cooperate to provide side recesses between the blocks. The ledge 82 of the block 80 is provided with a V-shaped groove or notch 86 and the ledge 83 closes the notch 86 to form an opening of triangular shape. Located on opposite sides of the stems and in the recesses provided by the blocks 80 and 81 blocks 90 the top surfaces of which are suitably gouged to provide irregular surfaces 91 in which the arms of the blank are deformed so as to provide resilient arms upon the blank. The resilient or deformed arms are provided with a ribbed portion 92 and a gripping portion 93 adapted to bite into the insulation of the cable. The blocks 90 are maintained against the stems of the blocks 80 and 81 by plain blocks 94. Guided between the semi-cylindrical portions 84 and 85 of the blocks 80 and 81 is a reduced portion of a plunger 95 which carries a V-shaped piercing member 96 which is adapted to extend into and slide in the V-shaped notch 86. The purpose of this member 96 is to pierce the blank and form a pointed prong 97 in the intermediate portion of the blank. The lower portion of plunger 95 is increased in size and is slidably supported within an aperture 98 provided in a base block 57. The plunger 95 is held in its normal or home position by a spring 99 located between washers 106; said washers and spring are held on a rod connected to the plunger by lock nuts 101. The upper washer bears against the lower side of the base 57 so that the tension of the spring 99 will urge the rod and plunger 95 downwardly as viewed in Fig. 13. The plunger 95 is provided with a transverse slot 102 to receive a toe 103 of a lever 104 pivotally supported at 105 on the base block 57. The plunger 95 is moved vertically upward by the lever 104 when said lever is moved in a clockwise direction as viewed in Fig. 13.

As before mentioned the operation for piercing a blank and deforming the arms is performed at station C, and is accomplished by a forming block 110 attached to the block 63 which is attached to the block 64 that is attached to the press head 36. The forming blocks 110 suitably support deforming members 112 the ends of which have irregular surfaces that are complementary to the recessed surfaces in the blocks 110. Yieldingly supported between the blocks 112 is the hollow plunger 113 having a triangular shaped opening and is of such size so as to receive the thickness of the metal and the piercing member 96 of the plunger 95. The piercing member cooperates with the opening in the plunger 113 to bend the prong at substantially right angles to the plane of the intermediate portion of the thus formed blank 60. A bracket 114 is attached to the block 64 by bolt and nut device 115. The bracket 114 also carries screw 116 which may be adjusted as desired by the lock nuts 117.

Figure 25:
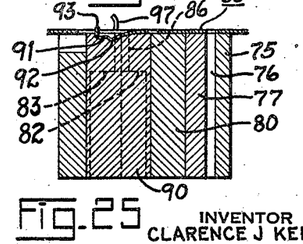
Fig. 25 is a sectional view taken on the line 25—25 of Fig. 24.

During the downward movement of the press head 35 the lower end of the screw 116 will first engage the lever 104 to rock it in a clockwise direction about its pivot 105, and vertically raise the plunger 95 upwardly causing the piercing member 96 to pierce the blank 60 to form the pointed prong 97 in the blank. As the press head 35 is continued further toward the members 90 the end surfaces of the blocks 112 force the arms into the complementary surfaces of the members 90 to deform the arms and form the ribs 92 and the gripping portion 93 as clearly shown in Fig. 25. While the arms of the blank are being deformed the pointed prong 97 and the reduced portion 96 of the plunger 95 will project into the triangular shaped opening of the plunger 113 so as to smooth out and bend the prong 97 to the proper angle relative to the plane of the blank.

Figure 6:
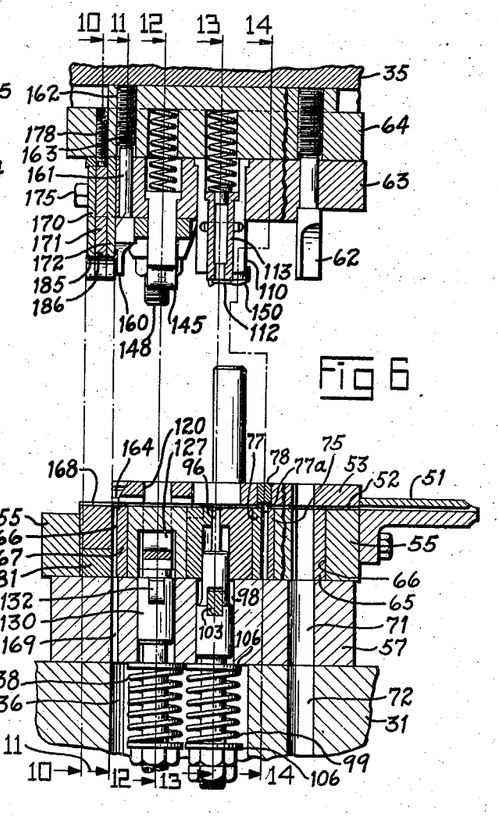
Fig. 6 is a sectional view taken on the line 6—6 of Fig. 5.
Figure 7:
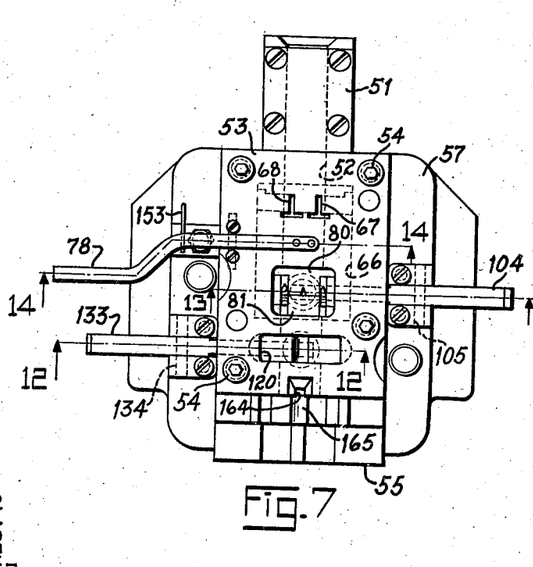
Fig. 7 is a plan view looking in the direction of the arrow 7 of Fig. 5, showing the parts of the apparatus attached to the base of the machine.
Figure 8:
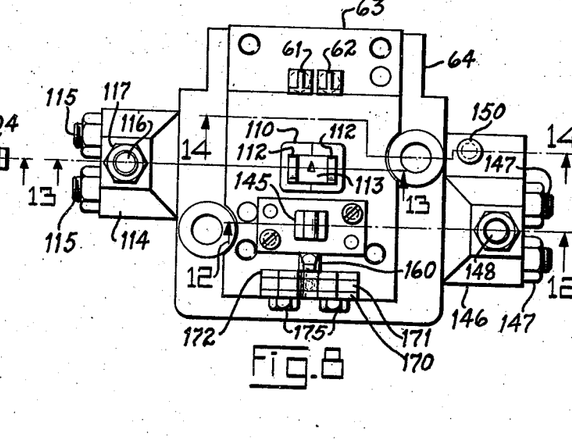
Fig. 8 is a plan view looking in the direction of arrow 8 of Fig. 5 of the apparatus attached to the head of the punch press turned end for end.
Figures 12, 13:
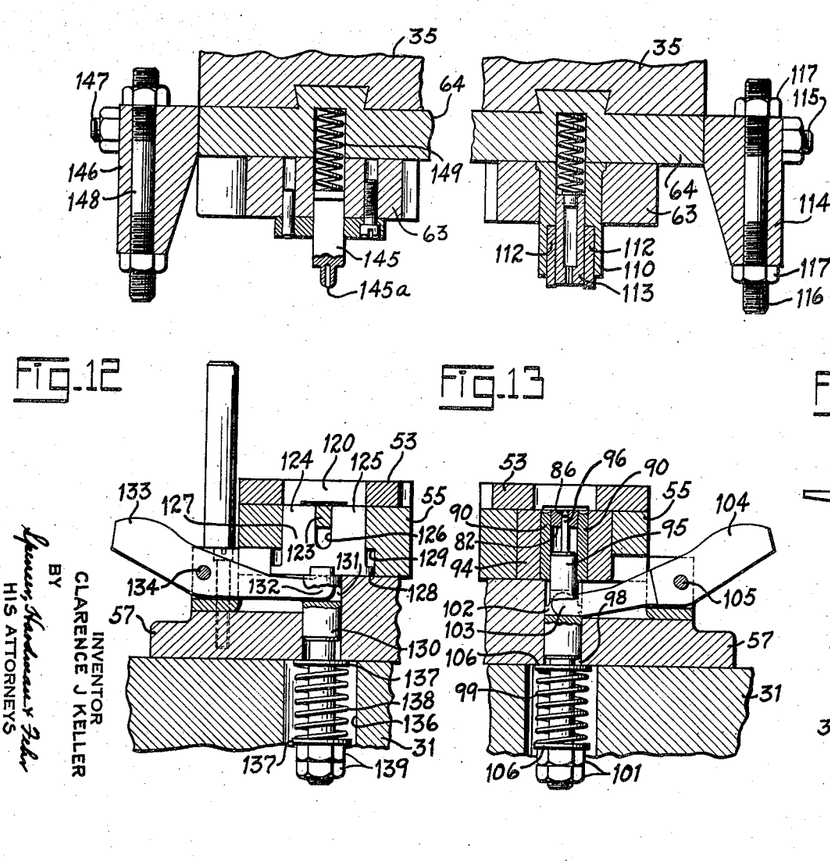
Fig. 12 is a sectional view taken on the line 12—12 of Figs. 6, 7, and 8.
Fig. 13 is a sectional view taken on the line 13—13 of Figs. 6, 7 and 8.

Referring to Figs. 6 and 12 the cover plate 53 is provided with an aperture 120 which extends over a pair of apertures 121 and 122 provided in the base plate 55. The apertures 121 and 122 are separated by a web or partition 123. These apertures are adapted to receive forming members 124 and 125, separated by a notch 126, of a movable member 127. The notch is adapted to receive the web 123 which provides a guide for the vertical movement of the members 124 and 125. These forming members cooperate to bend the thus far deformed blank into a U-shaped formation. The member 127 is provided with projections 128 at the bottom thereof; these projections are adapted to engage shoulders 129 provided in the member 55, said shoulders operating to limit the upward movement of the member 127 while the upper face of the block 57 limits the downward movement thereof. The lower side of the member 127 is provided with a shank 130 adapted to slide within a vertical opening in the base block 57. The shank 130 has a transverse opening 131 to receive a toe 132 of a lever 133, the lever being pivoted at 134 upon the base member 57. The lower end of the shank 130 is connected to a rod which projects into the opening 136 provided in the bed 31. The rod carries washers 137 between which there is a spring 138. One of the washers resting against the bottom of the base block 57 the other resting against the lock nuts 139. The spring operating to urge the plunger member 127 and shank 130 downwardly as viewed in Fig. 12.

As before mentioned the operation for forming the blank into a U-shaped formation, is performed at station D, is accomplished by a yieldable punch 145 having a recess 145a and carried by the block 63. A bracket 146 is secured to the block 64 by a bolt and nut device 147. An adjustable screw member 148 is supported on the bracket 146, with the lower end of the screw 148 adapted to engage the free end of the lever 133. During the downward movement of the press head 35 the lower end of the screw 148 will first engage the lever 133 to raise the member 127 vertically upward to bend the blank around a U-shaped end of the plunger 145 when the plunger engages the blank 60. When this occurs the prong 97 will enter the recess 145a so that the prong will not be damaged during the bending of the blank. A spring 149 urges the plunger against the blank which holds the center portion of the blank against the partition 123 while the edges of the blank are bent against the side walls of the plunger 145. The spring also permits movement of the plunger 145 relative to the block 64. When the press head 35 is in its lowest position the spring 149 will be fully compressed. During the upward movement of the head 35 the spring 149 is permitted to expand and at the same time hold the blank against the partition 123. Therefore, as the head 35 moves upwardly and as the end of screw 148 moves away from the lever 133 the spring 138 will move the plunger 127 downwardly to return same to its home position which is against the base head 57.

The work is automatically locked at station B by the device shown in Fig. 14. This locking device comprises the pins 77a adapted to project on both sides of the reduced neck portion 60a of the clip 60 as illustrated in Fig. 9. At the time the feeding mechanism begins to feed the strip 50 toward the right as viewed in Figure 1a the pins 77a are withdrawn from the slots on both sides of the neck portion 60a due to the lever 78 being engaged by the head of a pin 150 yieldingly supported on a lug 146 attached to the block 64. The strip 50 continues to move toward the right after the pin 150 has released the lever 78 during the upward movement of the head 35. Therefore while the strip 50 is still moving a spring 153 causes the lever 78 to move in a clockwise direction as viewed in Fig. 14 in order to move the pins 77a against the moving strip 50. The strip will continue to move until the slots of the blank 60 are located immediately below the pins 77a whereupon the pins 77a will drop into the slots and arrest the movement of the strip 50.

If the feeding apparatus cannot be adjusted so that it will feed exactly the required distance there may be a slight over-travel since the rolls 45 and 46 may slip on the strip 50 after the pins 77a interlock with the slots provided in the block 75 to prevent further movement of the strip. In this way the strip is located in the correct position for the piercing and deforming operations performed at station C or for the operations performed at stations D, E, and F. At the station E the neck 60a is cut off by punch 160 having a shank 161 extending thru the block 63 and into a shaft hole 162 in the block 64. Said hole receiving a set screw 163 which may be screwed down against the shank 161. The punch 160 is received by a slot 164 in the end of the cover late 53 and passes into a die aperture provided by groove 166 in a block 167 enclosed by the anvil 168. Blocks 167 and anvil 168 are received by an aperture 169 in the frame block 55. The neck portions 60a which are cut away by the punch 160 are forced by the punch thru the aperture 166 which is in alignment with the aperture 169 in the base block 57.

Referring to Fig. 6 the operation of bending the thus far form blank 60 around the insulation of the cable is preformed by notch forming bars 170, 171 and 172 while the clip 60 rests upon an anvil 168 as shown more particularly in Figs. 6 and 10. The bars 170, 171 and 172 are received by a recess 174 in the block 63 and clamped therein by screws 175. It will be noted that bar 172 is provided with an angular portion 176 having an aperture 177 thru which a screw 178 passes that bears against the upper edge of the bar 171 in order to limit the upper movement thereof. The upper edge of the bar 171 abuts the lower surface of the angular portion 176 of the bar 172. While the screws 175 are loose the bars 170, 171 and 172 are moved upwardly in the recess 174 of block 63 until the angular portion of the bar 172 touches the lower surface of the block 64. Since the screw 178 passes thru the aperture 177 the upper surface of the bar 171 will touch the lower end of the screw 178 which may be turned in order to adjust the bar 171 vertically so as to locate it in the desired position relative to the bars 170 and 172. The anvil 168 is an insert in the block 181 shown in Fig. 10, said block being received by an aperture 169 in the frame block 55 and secured therein by screws 182.

The lower surface of the bars 170, 171 and 172 are provided with notches 185 which operate to complete the bending of the blank around the cable. It will be noted that the notched portion of the bar 171 is provided with an additional notched portion 186. The purpose of the notch 186 is to receive the rib portion 92 formed on the resilient arm of the blank so as not to damage the rib 92 as a ferrule is attached to the cable at station F. At station F the prong 97 is forced into the insulation of the cable into engagement with the conducting element of the cable and the gripping members 93 into biting engagement with the insulation of the cable while the remainder of the blank is bent around the cable as shown in Figs. 3 and 4.

To use a machine to complete the formation of the ferrule and securely attach the ferrule to the cable, the operator places upon the terminal clip 60 as shown in Fig. 9 an end of an insulated conductor. While the conductor is located between the arms of the thus far formed U-shaped blank and moved toward the cover plate 53 until its end engages the end of the cover plate 53. Then the press is caused to operate by tripping a clutch of a conventional type (not shown) and a press shaft 33 is caused to make one complete revolution and stop automatically. A suitable handle, not shown, controls a clutch of the press. The shaft 33 rotates in a direction of the arrow 100 in Fig. 1, the head 35 moves downwardly to perform the various operations, namely, punching the flat stock to form arms at its edges, piercing the blank to provide a pointed prong, and deforming the arms to form yieldable holding means and providing biting members, bending the blank into a semi-circular formation, cutting off the clip thus formed and then attaching it to an electrical conductor. During the downward movement of the head 35 the feeding mechanism is backed up for the feeding operation which takes place during the upward movement of the head.

It is therefore apparent from the foregoing description of construction and mode of operation of the machine for forming and attaching a ferrule to the end of the cable which is adapted to be inserted into a socket of an electrical apparatus, such as a distributor head of an ignition timer for use with an internal combustion engine, the cost of operation of providing a conductor with a yieldable ferrule thereon has been materially reduced because one machine performs the operations of forming the ferrule and of attaching it to the cable, and because there is a considerable saving of time as compared with the method of manufacturing requiring that the ferrule be made on one machine and then later attach the ferrule to the conductor by another machine.

Another important advantage is had by the reason of the fact that the raw material is not manufactured into ferrules except as needed.

While the embodiment of the present invention as herein disclosed, constitutes a preferred form, it is to be understood that other forms might be adopted, all coming within the scope of the claims which follow.

What is claimed is as follows:

1. Apparatus for forming a terminal ferrule and for attaching the ferrule to a cable, comprising in combination; means for forming from a strip of sheet metal connected blanks with each blank having an intermediate portion and spaced parallel arms on the edges thereof; means for piercing the intermediate portion of the blanks to provide a pointed portion; means for deforming the arms to provide gripping end portions thereon; means for forming the pierced blank into U-shaped members; means for severing the U-shaped members from the remainder of the strip; and means for forming the U-shaped members about the cable and causing the pointed portion to pierce the insulation and engage the conducting element of the cable and the gripping end portions to pinch the outer surface of the cable.

2. Apparatus for forming a terminal ferrule and for attaching the ferrule to a cable, comprising in combination; means for forming from a strip of sheet metal connected blanks with each blank having an intermediate portion and spaced parallel arms on the edges thereof; means for piercing the intermediate portion of the blanks to provide a pointed portion; means for deforming the arms to form outwardly extending ribs and inwardly extending tangs on the ends of the arms; means for bending the pierced blank into U-shaped members; means for severing the U-shaped members from the remainder of the strip; means for forcing the pointed portion through the insulation and into engagement with the conducting element of the cable; and means for bending the arms around the cable causing the tangs to pinch the insulation of the cable and complete the formation of the ferrule.

3. Apparatus for forming a terminal ferrule and for attaching the ferrule to an end of a cable, comprising in combination; means for forming from a strip of sheet metal connected blanks with each blank comprising an intermediate portion and spaced branches at its edges; means for penetrating the intermediate portion of the blanks to form a pointed prong, said prong being bent at an angle with respect to the blanks; means for bending the branch members away from the plane of the blanks to form ribs and pinching members on the ends of the branches; means for bending the pierced members into U-shaped members; means for severing the foremost U-shaped member from the strip; and means for forcing the pointed prong of the severed member into engagement with the conducting element of the cable and to complete the bending of the branches around the cable causing the pinching member to engage the cable in order to secure the ferrule to the cable.

4. An apparatus for forming a terminal ferrule and attaching the ferrule to a cable comprising, in combination; punch and die members for forming from a strip of sheet metal connected blanks with each blank comprising an intermediate portion and having a plurality of spaced arms, said blanks being connected by narrow neck portions; means for feeding intermittently the strip of stock to the punch and die members; means for piercing the intermediate portion of the blanks to provide a prong; means for bending the arms out of the plane of the blanks to provide yieldable gripping members; means for bending the thus formed blanks into a U-shaped formation adapted to receive an end of the cable; means for severing the foremost neck from the strip to free the foremost blank of U-shaped formation; and means for completing the bending of the free blank around the cable so that the prong will contact with the conducting element of the cable and the gripping members will engage the cable to hold the ferrule on the cable.

5. An apparatus for forming a terminal ferrule and attaching the ferrule to a cable, comprising in combination; punch and die members for forming from a strip of sheet metal connected blanks with a plurality of spaced arms; means for feeding the strip to the punch and die members; means operating simultaneously with the punch and die members for piercing a section of the blanks to form a pointed member and to bend the arms out of the plane of the blanks and to deform the ends thereof to provide gripping members; means operating simultaneously with the punch and die members to bend the blanks into U-shaped members; means operating simultaneously with the punch and die members for severing the foremost U-shaped member from the strip; and means operating simultaneously with the punch and die members for bending the severed U-shaped member around a cable to form the ferrule, and causing the pointed member to pierce the insulation and engage the conducting element of the cable and the gripping members to punch the outer surface of the cable in order to secure the ferrule to the cable.

6. Apparatus for forming a terminal ferrule and for attaching the ferrule to a cable, comprising in combination; punch and die members for forming connected blanks from a strip of sheet metal with each blank having a medial portion interposed between laterally spaced arms; means for feeding the strip of sheet metal step by step to the punch and die members; means having provisions for piercing the medial portion of the blanks to provide a pointed portion and having provisions for deforming the arms of said blank to provide gripping end portions thereon; means for forming the pierced blank into a U-shaped member; means for severing the U-shaped member from the remainder of the strip; and means for attaching the free U-shaped member about the cable whereby the pointed portion will pierce the insulation and engage the conducting element of the cable and the gripping end portions to pinch the outer surface of the cable.

CLARENCE J. KELLER.